US012576757B2

(12) United States Patent
Younes et al.

(10) Patent No.: US 12,576,757 B2
(45) Date of Patent: Mar. 17, 2026

(54) VEHICLE SEAT, FOR AT LEAST TWO USERS

(71) Applicant: FAURECIA Sièges d'Automobile, Nanterre (FR)

(72) Inventors: Mustapha Younes, Mlleneuve la Garenne (FR); Philippe Demptos, Le Malesherbois (FR); Roland Faure, Etampes (FR)

(73) Assignee: FAURECIA Sièges d'Automobile, Nanterre (FR)

( * ) Notice: Subject to any disclaimer, the term of this patent is extended or adjusted under 35 U.S.C. 154(b) by 429 days.

(21) Appl. No.: 18/227,493

(22) Filed: Jul. 28, 2023

(65) Prior Publication Data

US 2024/0034205 A1 Feb. 1, 2024

(30) Foreign Application Priority Data

Jul. 29, 2022 (FR) ...................................... 2207918

(51) Int. Cl.
| | |
|---|---|
| *B60N 2/30* | (2006.01) |
| *B60N 2/015* | (2006.01) |
| *B60N 2/68* | (2006.01) |

(52) U.S. Cl.
CPC ........... *B60N 2/3013* (2013.01); *B60N 2/015* (2013.01); *B60N 2/68* (2013.01); *B60N 2205/35* (2013.01)

(58) Field of Classification Search
CPC ... B60N 2/3013; B60N 2/015; B60N 2205/35
See application file for complete search history.

(56) References Cited

U.S. PATENT DOCUMENTS

| | | | |
|---|---|---|---|
| 5,700,058 A | * | 12/1997 | Balagurumurthy .......................... B60N 2/42709 297/440.15 |
| 2016/0185261 A1 | | 6/2016 | Hammann |
| 2019/0016239 A1 | * | 1/2019 | Vogt ..................... B60N 2/3013 |
| 2020/0130547 A1 | * | 4/2020 | Modh .................. B60N 2/682 |
| 2021/0095735 A1 | * | 4/2021 | Pistilli ................... F16F 1/3732 |
| 2022/0032824 A1 | * | 2/2022 | Macias ............... B60N 2/3011 |
| 2022/0032826 A1 | * | 2/2022 | Klitting ................... B60N 2/68 |

FOREIGN PATENT DOCUMENTS

| | | |
|---|---|---|
| DE | 29620145 U1 | 1/1997 |
| DE | 102013003790 B3 | 2/2014 |
| DE | 102013003789 B3 | 3/2014 |
| DE | 102015211811 A1 | 5/2016 |
| EP | 3643563 A1 | 4/2020 |
| WO | 2014090656 A1 | 6/2014 |

* cited by examiner

*Primary Examiner* — David R Dunn
*Assistant Examiner* — Tania Abraham
(74) *Attorney, Agent, or Firm* — Barnes & Thornburg LLP

(57) ABSTRACT

A vehicle seat comprising a guiding device comprising a first articulation portion and a second articulation portion, the first articulation portion has a first articulation surface, the second articulation portion has a second articulation surface, a first stop element and a second stop element, a first backrest, a second backrest comprising a first flange and a second flange, the first flange has a first bore cooperating with the first articulation surface, the second flange has a second bore cooperating with the second articulation surface, the second bore has a circular portion and a notch, the notch of the second bore is configured to allow the passage of the second stop element through the notch.

11 Claims, 5 Drawing Sheets

VEHICLE SEAT, FOR AT LEAST TWO USERS

PRIORITY CLAIM

This application claims priority to French Patent Application No. FR2207918, filed Jul. 29, 2022, which is expressly incorporated by reference herein.

BACKGROUND

The present disclosure relates to a vehicle seat, configured to receive at least two users, and in particular a motor vehicle seat. The present disclosure relates in particular to a vehicle seat of the type comprising a first backrest and a second backrest. The present disclosure also relates to a vehicle comprising the seat.

SUMMARY

According to the present disclosure, a vehicle seat, configured to receive at least two users, the vehicle seat comprising:

- a first support and a second support intended to be connected to a vehicle chassis,
- a guiding device comprising: a first support portion and a second support portion, the first support portion cooperates with the first support and the second support portion cooperates with the second support, a first articulation portion and a second articulation portion, the first articulation portion has a first articulation surface, the second articulation portion has a second articulation surface,
- a first backrest comprising a first backrest structure, the first backrest structure is pivotably mounted relative to the first support and the second support around an axis of rotation extending in a transverse direction,
- a second backrest pivotably mounted around the axis of rotation on the guiding device, the second backrest comprises a second backrest structure, the second backrest structure comprises: a first flange having a first bore, the first bore cooperates with the first articulation surface, and a second flange having a second bore, the second bore cooperates with the second articulation surface.

In illustrative embodiments, the second hinge portion further has a first stop element and a second stop element.

In illustrative embodiments, the second articulation surface is arranged between the first stop element and the second stop element along the transverse direction, the first stop element prevents the movement of the second flange relative to the guiding device along the transverse direction in a first direction, the second stop element prevents the movement of the second flange relative to the guiding device along the transverse direction in a second direction, opposite the first direction.

In illustrative embodiments, the second bore has in cross-section perpendicular to the axis of rotation a circular portion and a notch (slot), the notch of the second bore is configured to allow the passage of the second stop element through the notch by translation along the transverse direction (in an insertion position of the second backrest relative to the guiding device around the axis of rotation).

In illustrative embodiments, the second backrest is held relative to the guiding device in the transverse direction. Preferably, the angular position around the axis of rotation of the second backrest relative to the guiding device wherein the second stop element is aligned with the notch of the second bore, referred to as the insertion position, is no longer achievable by the user when the seat is mounted in the vehicle, for example because the second backrest would collide with the chassis of the vehicle in the insertion position.

In illustrative embodiments, the second articulation portion is preferably configured to pass through the first bore. In other words, the guiding device is configured to be inserted through the first flange and then the second flange by translation along the transverse direction in the first direction.

In illustrative embodiments, the second backrest can be assembled on the guiding device by translation following the transverse direction.

In illustrative embodiments, the first bore has in cross-section perpendicular to the axis of rotation a first circular portion and a first notch, the circular portion of the second bore forming a second circular portion and the notch of the second bore forming a second notch, and the first notch is configured to allow the passage of the first stop element and the second stop element through the first notch by translation along the transverse direction.

In illustrative embodiments, the bulk and mass are thus reduced for a given mechanical strength.

In illustrative embodiments, the first circular portion has a first diameter and the second circular portion has a second diameter, the first diameter is substantially equal to the second diameter.

In illustrative embodiments, the vehicle seat preferably further has the following features:

- the first stop element is a first stud forming a protrusion relative to the second articulation surface,
- the second stop element is a second stud forming a protrusion relative to the second articulation surface, the first stud is angularly aligned with the second stud around the axis of rotation, and
- the first notch is angularly aligned with the second notch around the axis of rotation.

In illustrative embodiments, the assembly of the guiding device and the second backrest is simplified while keeping the same angular orientation around the axis of rotation of the second backrest relative to the guiding device and by simply translating the second backrest relative to the guiding device along the transverse direction.

In illustrative embodiments, the first stud has a chamfer configured to position and closely maintain the second flange between the first stud and the second stud by rotating the second backrest relative to the guiding device around the axis of rotation after insertion of the second stud through the second bore.

In illustrative embodiments, the assembly of the seat with the guiding device is facilitated and the holding of the second backrest relative to the guiding device in the transverse direction is improved.

In illustrative embodiments, the guiding device comprises a main portion and a retaining portion, the main portion comprises the first hinge portion and the main portion is metallic, the retaining portion comprises the second hinge portion and the retaining portion is made of plastic and molded on the main portion. Thus, the creation of the guiding device is simplified.

In illustrative embodiments, the vehicle seat according to the disclosure, any of the following arrangements may also be employed:

the first backrest is attached to the guiding device, and the guiding device is pivotably mounted around the axis of rotation relative to the first support and the second support;

the guiding device comprises a guide member and a guide shaft, the guide member cooperates with the first support portion, the guide shaft comprises the second support portion, the first hinge portion and the second hinge portion, and the guide shaft is rigidly attached to the guide member by the first backrest structure;

the first hinge portion and the second hinge portion are arranged between the first support portion and the second support portion in the transverse direction.

The present disclosure further relates to a vehicle comprising at least one vehicle seat.

Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

The detailed description particularly refers to the accompanying figures in which.

DETAILED DESCRIPTION

Figure 1:
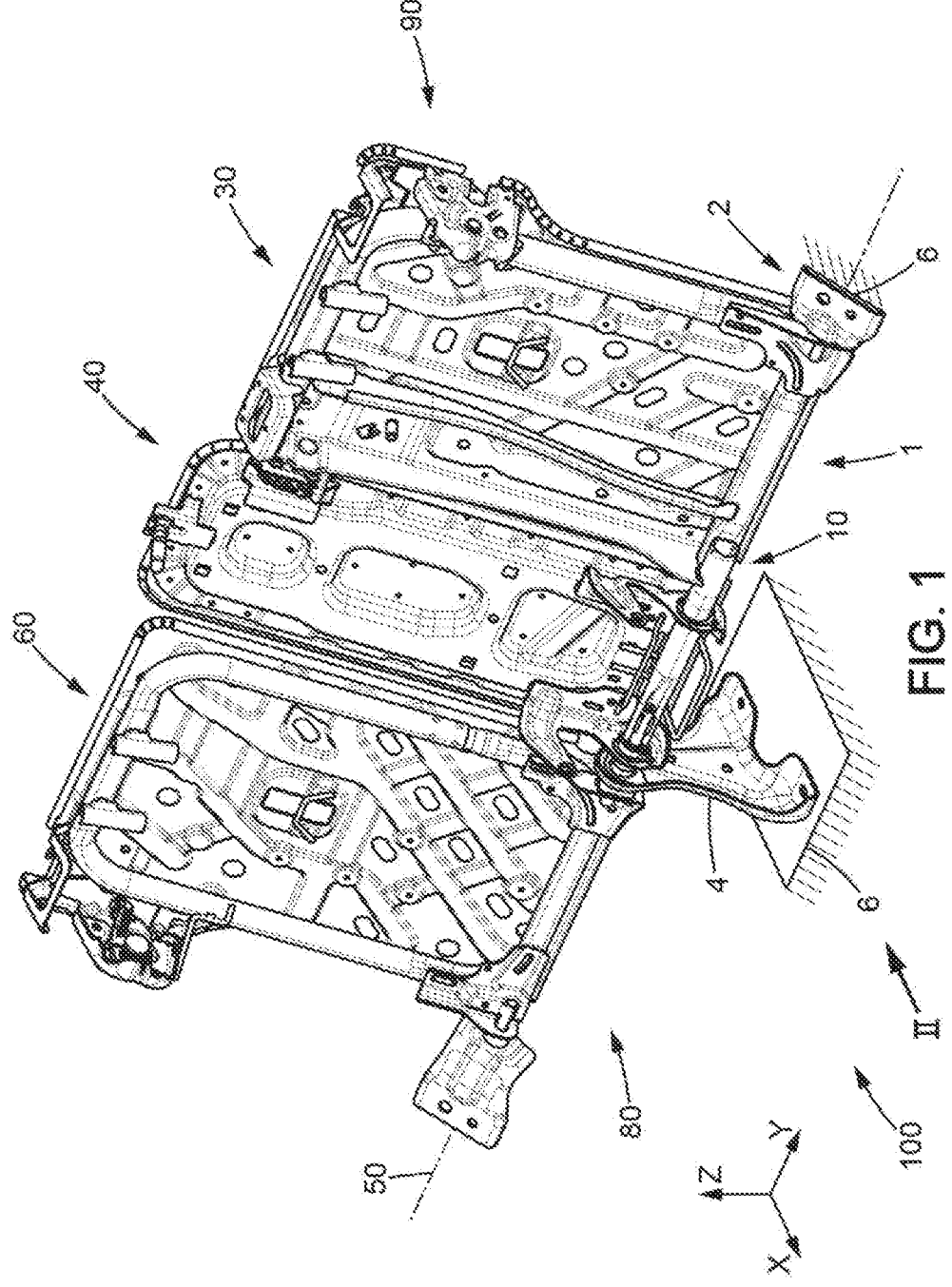
FIG. 1 shows a perspective view of a vehicle comprising a seat.
Figure 2:
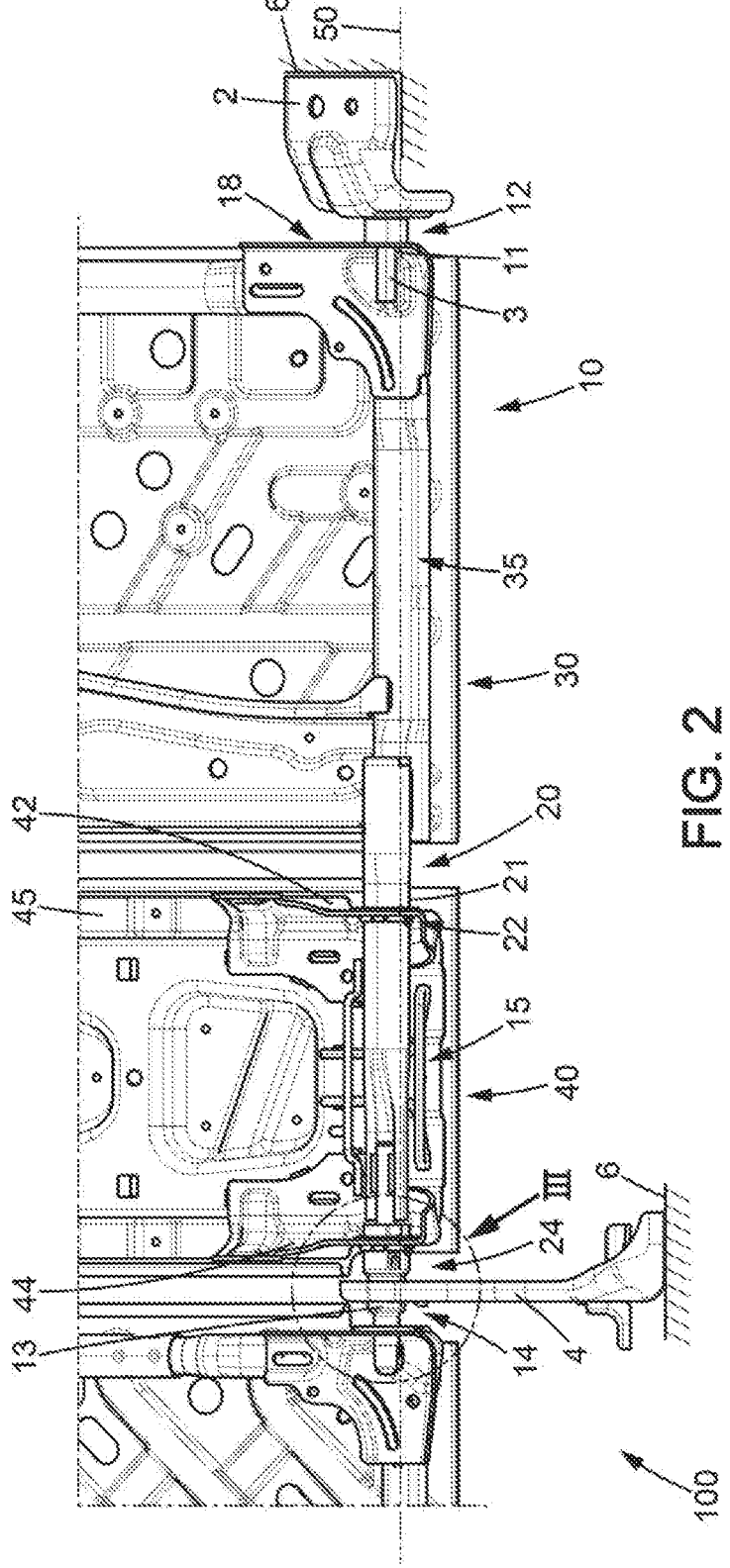
FIG. 2 is a partial representation on an enlarged scale according to the arrow marked II in FIG. 1.
Figure 3:
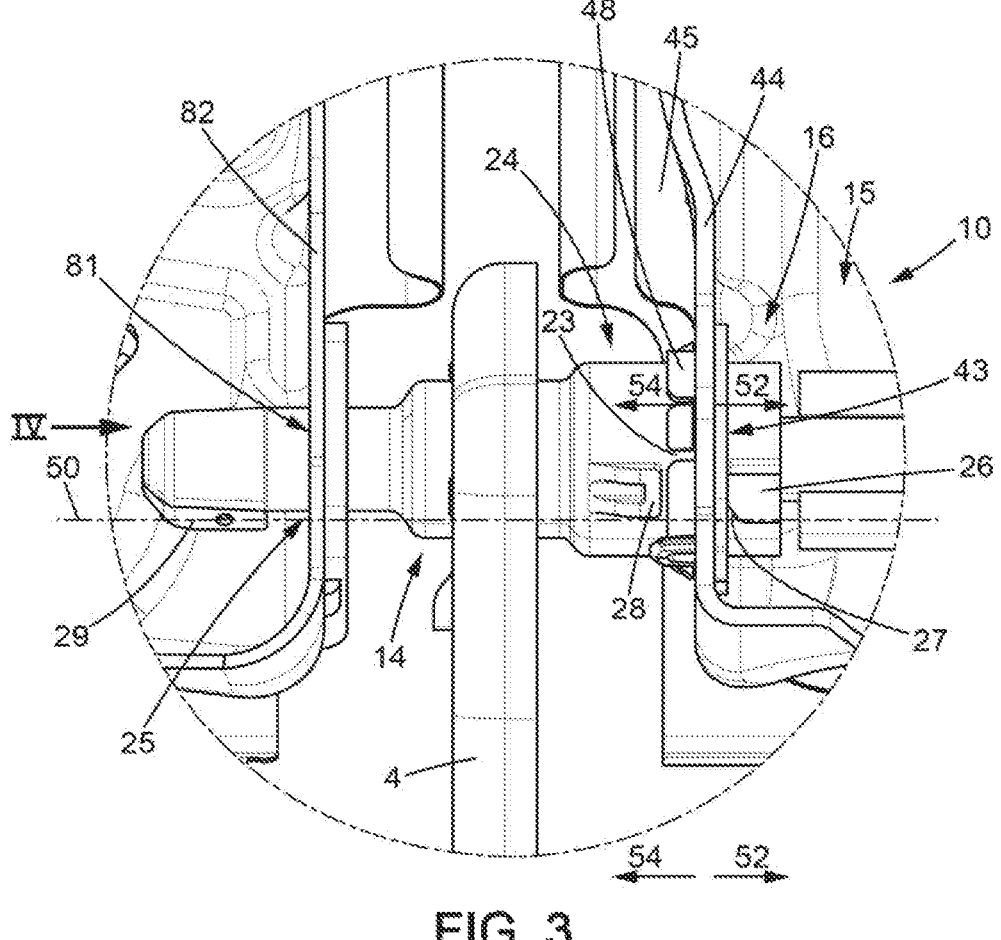
FIG. 3 is a representation on an even more enlarged scale of the area marked III in FIG. 2.

FIG. 1 shows a vehicle 100, more specifically a motor vehicle. The vehicle 100 comprises a chassis 6 and a seat row formed from a set of seats 90. The vehicle 100 has a longitudinal direction X, corresponding substantially to the direction of movement of the vehicle, a transverse direction Y, perpendicular to the longitudinal direction X and an elevation direction Z, perpendicular to the longitudinal direction X and to the transverse direction Y. The seat assembly 90 comprises a seat 1 and an auxiliary seat 80.

The seat 1 comprises a first support 2, a second support 4, a guiding device 10, a first backrest 30 and a second backrest 40, thus a first squab and a second squab (not shown). The first support 2 and the second support 4 are each fixed to the chassis 6, preferably by screws or bolts (not shown). The first squab and the second squab are not shown. The first squab is positioned aligned with the first backrest 30 and the second squab is arranged aligned with the second backrest 40. The first squab and the second squab may be distinct and/or folded, but the first squab and the second squab preferably form a single-piece portion, attached to a chassis 6 of the vehicle 1.

The guiding device 10 comprises a first support portion 12, a second support portion 14, a first hinge portion 22 and a second hinge portion 24.

In the embodiment shown, the guiding device 10 is pivotably mounted around an axis of rotation 50 relative to the chassis 6. The axis of rotation 50 extends along the transverse direction Y. Indeed, the first support portion 12 is pivotably mounted around the axis of rotation 50 relative to the first support 2 and the second support portion 14 is pivotably mounted relative to the second support 4 around the axis of rotation 50.

More specifically, the guiding device 10 comprises a guide member 18 of which the first hinge portion 22 is part. The first hinge portion has a guide bore 11. The first support 2 comprises a support shaft 3 and the support shaft 3 cooperates with the guide bore 11.

The support 4 has a support bore 5. The second support portion 14 comprises a support surface 13 which is cylindrical. The support surface 13 cooperates with the support bore 3.

The first backrest 30 comprises a first backrest structure 35. In the embodiment shown, the first backrest structure 35 is rigidly attached to the guiding device 10.

The second backrest 40 comprises a second backrest structure 45, a first flange 42 and a second flange 44. The first flange 42 and the second flange 44 are rigidly attached to the second backrest structure 45. The first flange 42 has a first bore 41. The first bore 41 comprises, perpendicular to the transverse direction Y, a first circular portion 41C and a first notch 41E. The first circular portion 41C has a first diameter $\Phi41$. The second bore 43 comprises, perpendicular to the transverse direction Y, a second circular portion 43C and a second notch 43E. The second circular portion 43C has a second diameter $\Phi43$. The second diameter is substantially equal to the first diameter.

The first articulation portion 22 comprises a first articulation surface 21 which is cylindrical, of circular cross-section and extends around the axis of rotation 50. The first articulation surface 21 cooperates with the first circular portion 41C to rotationally guide the first flange 42 around the axis of rotation 50 relative to the guiding device 50. The first articulation portion 22 is arranged between the first support portion 12 and the second support portion 14 along the transverse direction Y.

The second articulation portion 24 comprises a second articulation surface 23, a first stop element 26 and a second stop element 28. The second articulation surface 23 is arranged between the first stop element 26 and the second stop element 28 along the transverse direction Y. The second articulation surface 23 is cylindrical, with a circular cross-section and extends around the axis of rotation 50. The second articulation surface 23 cooperates with the second circular portion 43C to rotationally guide the second flange 44 around the axis of rotation 50 relative to the guiding device 10. Thus, the second backrest 40 is rotationally guided around the axis of rotation 50 relative to the guiding device 10. The second articulation portion 24 is arranged between the first support portion 12 and the second support portion 14 in the transverse direction Y.

Figure 4:
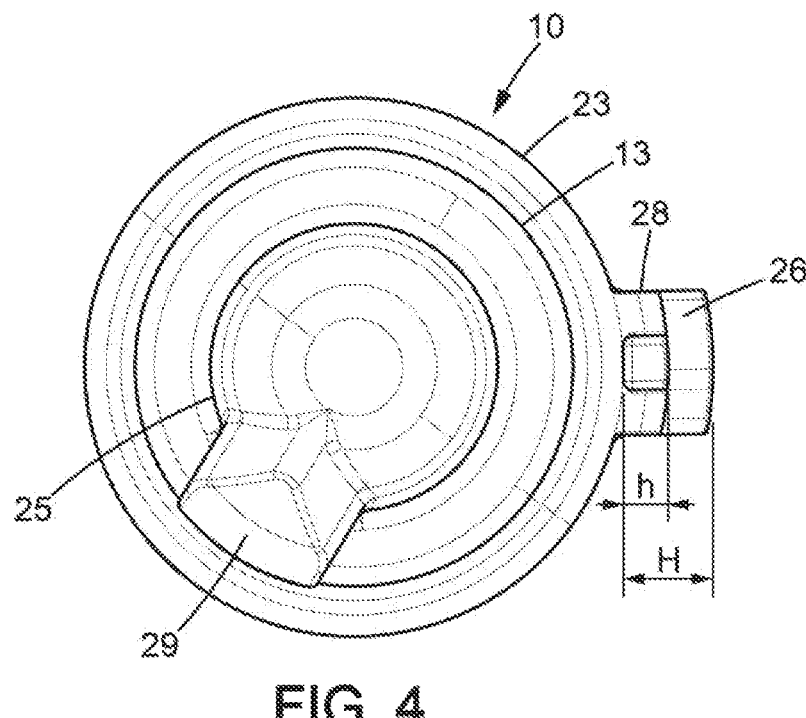
FIG. 4 is a partial representation according to the arrow marked IV in FIG. 3.

The first stop element 26 and the second stop element 28 are rigid. As shown in particular in FIG. 4, the first stud 26 and the second stud 28 are angularly aligned around the axis of rotation 50. The first stop element 26 forms a stud protruding relative to the second articulation surface 23 of a first height H. The second stop element 28 also forms a stud but protruding relative to the second articulation surface 23 of a second height H. The first height H is greater than the second height H, preferably between 50% and 200% more, in other words between 1.5 and 3 times the first height H.

Figure 5:
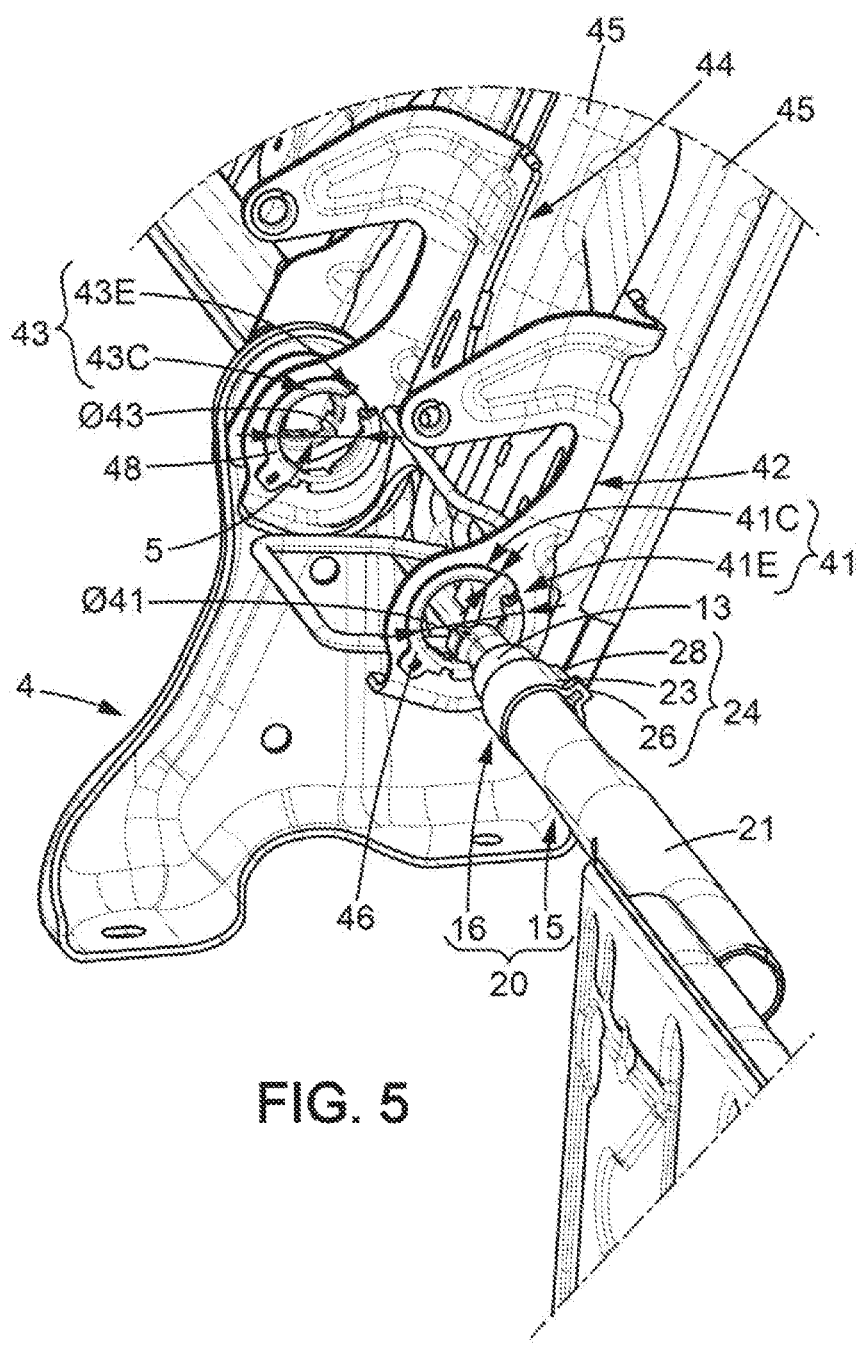
FIG. 5 is a perspective representation of the assembly of the seat.

As shown in particular in FIG. 5, the first notch 41E is angularly aligned with the second notch 43E.

The guiding device 10 further comprises a third articulation surface 25 and a third stop element 29. The auxiliary seat 80 has an auxiliary flange 82. The auxiliary flange 82 has an auxiliary bore 81. The third articulation surface 25 cooperates with the auxiliary bore 81 to rotationally guide the auxiliary seat 80 around the axis of rotation 50. The third stop element 29 is formed by a lug protruding from the third articulation surface 25. The auxiliary bore 81 has a notch to allow the passage of the third stop element 29 through the auxiliary bore 81 by translation along the transverse direction Y.

The seat 1 further comprises a first locking device and a second locking device. The first locking device has an active state wherein it makes it possible to lock the first backrest 30 relative to the chassis 6 in a comfort position. When the first backrest 30 is locked in the comfort position by the first locking device, a user can place their back against the first backrest 30. When the first locking device is in an inactive state, the first backrest 30 can be pivoted (with the guiding device 10, in the embodiment shown) around the axis of rotation 50 and be brought into a folded-down position wherein the first is bearing against the seat. Of course, from the folded-down position, the first backrest 30 can be returned to the comfort position by rotation around the axis of rotation 50 and be held in the comfort position by the first locking device. The second locking device has an active state wherein it makes it possible to lock the second backrest 40 relative to the first backrest 30 and an inactive state wherein the second backrest 40 is free to rotate around the axis of rotation 50 relative to the first backrest 30. When the second locking device is in the active state, the second backrest 40 is rigidly connected to the first backrest 30. The second backrest 40 is therefore in the comfort position wherein a user can engage against the second backrest 40 when the first backrest 30 is in the comfort position and the second backrest 40 is in the folded-down position, bearing against the seat, when the first backrest 30 is in the folded-down position. When the first backrest 30 is in the comfort position and the second locking device is in the inactive state, the second backrest 40 can be pivoted around the axis of rotation 50 to be brought into the folded-down position. The second backrest 40 can then be returned to the comfort position by rotation around the axis of rotation 50 and re-locked to the first backrest 30 or, alternatively, the first backrest 30 can be brought into the folded-down position and re-locked to the second backrest 40.

As shown in FIG. 5, to assemble the second backrest 40 on the guiding device 10, to which the first backrest 30 is attached, the second backrest 40 is angularly placed in an insertion position offset between 120 degrees and 240 degrees relative to the first backrest 30. In this insertion position, the first stop element 26 and the second stop element 28 are angularly aligned around the axis of rotation 50 with the first notch 41E and the second notch 43E. The insertion position is such that it cannot be obtained when the seat 1 is attached to the chassis 6 of the vehicle, since the second backrest 40 would collide with the chassis 6.

The second backrest 40 is then translated along the transverse direction Y in a first direction 52. The third articulation surface 25 and the third stop element 29 pass through the first bore 41. Then, the second articulation surface 23 passes through the first bore 41, and the second stop element 28 and the first stop element 26 pass successively through the first notch 41E. Then, while maintaining the insertion position, the translation of the second backrest 40 relative to the guiding device 10 along the transverse direction Y, in the first direction 52, is continued. The third articulation surface 25 and the third stop element 29 pass through the second bore 43. Then, the second stop element 28 passes through the second notch 43E, then the first stop element 26 abuts against the second circular portion 43C, the second stop element 28 protruding from the second notch 43E.

Then, the third articulation surface 25 and the third stop element 29 successively pass through the support bore 5 and the additional bore 81.

The second backrest 40 is then pivoted around the axis of rotation 50 relative to the guiding device 10 to bring it substantially into the extension of the first backrest along the transverse direction Y. The first stop element 26 has a chamfer 27 which slightly displaces the second backrest 40 relative to the guiding device 10, in order to position and closely maintain the second bore 43 between the first stop element 26 and the second stop element 28 along the transverse direction Y. The first stop element 26 prevents the second flange 44 from moving relative to the guiding device 10 along the transverse direction Y in the first direction 52. The second stop element 28 prevents the second flange 44 from moving relative to the guiding device 10 along the transverse direction Y in a second direction 54, opposite the first direction 52.

The third stop element 29 retains the guiding device 10 relative to the auxiliary seat 80 in the first 52 along the transverse direction Y. The third stop element 29 prevents the guiding device 10 from moving relative to the second flange 44 (therefore the auxiliary seat 80) along the transverse direction Y in the first direction 52. Conversely, the third stop element 29 prevents the second flange 44 (therefore the auxiliary seat 80) from moving relative to the guiding device 10 along the transverse direction Y in the second direction 54.

It will be noted that in the shown embodiment the first flange 42 comprises a first sleeve 46, in order to increase the width of the first circular portion 41C, along the transverse direction Y, without increasing the width of the rest of the first flange 42. The cooperation surface between the first articulation surface 21 and the first bore 41 is thus increased without any notable increase in the weight of the first flange 42. Likewise, the second flange 44 comprises a second sleeve 48, in order to increase the width of the second circular portion 43C, along the transverse direction Y, without increasing the width of the rest of the second flange 44. The cooperation surface between the second articulation surface 23 and the second bore 43 is thus increased without any notable increase in the weight of the second flange 44.

In the embodiment shown, the guiding device 10 comprises a guide shaft 20 and the guide member 18. The guide shaft 20 is remote from the guide member 18 along the longitudinal direction Y. The guide shaft 20 is rigidly attached to the first backrest structure 35 and the guide member 18 is rigidly attached to the first backrest structure 35, so that the guide member 18 is rigidly attached to the guide shaft 20 via the first backrest structure 35. The guide member 18 comprises the first support portion 12. The guide shaft comprises the second support portion 14, the first hinge portion 22 and the second hinge portion 24.

Furthermore, the guiding device 10 comprises a main portion 15 and a retaining portion 16. The main portion 15 is metallic. The main portion 15 is attached directly to the first backrest structure 35. The main portion 15 comprises the first support portion 12 and the first hinge portion 22. The retaining portion 16 is made of plastic material overmolded onto the main portion 15. The retaining portion 16 comprises the second support portion 14 and the second hinge portion 24. In the shown embodiment, the retaining portion 16 is entirely part of the guide shaft 20.

The present disclosure relates to a vehicle seat, configured to receive at least two users, and in particular a motor vehicle seat. The present disclosure relates in particular to a vehicle seat of the type comprising a first backrest and a second backrest. The present disclosure also relates to a vehicle comprising the seat.

The seat may for example belong to a seat row of the vehicle. The seat is configured to receive at least both users seated side-by-side. The seat row may comprise another seat and therefore the seat row can accommodate at least one other person. Thus, the seat row can accommodate at least three persons.

A vehicle seat, configured to receive at least two users, the vehicle seat comprising:

- a first support and a second support intended to be connected to a vehicle chassis,
- a guiding device comprising:
- a first support portion and a second support portion, the first support portion cooperates with the first support and the second support portion cooperates with the second support,
- a first articulation portion and a second articulation portion, the first articulation portion has a first articulation surface, the second articulation portion has a second articulation surface,
- a first backrest comprising a first backrest structure, the first backrest structure is pivotably mounted relative to the first support and the second support around an axis of rotation extending in a transverse direction,
- a second backrest pivotably mounted around the axis of rotation on the guiding device, the second backrest comprises a second backrest structure, the second backrest structure comprises:
- a first flange having a first bore, the first bore cooperates with the first articulation surface, and
- a second flange having a second bore, the second bore cooperates with the second articulation surface.

The present disclosure aims to maintain the second backrest in the transverse direction, while maintaining a relatively simple seat, with limited cost and mass, and which is able to be produced relatively easily.

To remedy the aforementioned problems, in accordance with the disclosure, the vehicle seat further has the following features:

- the second hinge portion further has a first stop element and a second stop element,
- the second articulation surface is arranged between the first stop element and the second stop element along the transverse direction, the first stop element prevents the movement of the second flange relative to the guiding device along the transverse direction in a first direction, the second stop element prevents the movement of the second flange relative to the guiding device along the transverse direction in a second direction, opposite the first direction,
- the second bore has in cross-section perpendicular to the axis of rotation a circular portion and a notch (slot), the notch of the second bore is configured to allow the passage of the second stop element through the notch by translation along the transverse direction (in an insertion position of the second backrest relative to the guiding device around the axis of rotation).

Thus, the second backrest is held relative to the guiding device in the transverse direction. Preferably, the angular position around the axis of rotation of the second backrest relative to the guiding device wherein the second stop element is aligned with the notch of the second bore, referred to as the insertion position, is no longer achievable by the user when the seat is mounted in the vehicle, for example because the second backrest would collide with the chassis of the vehicle in the insertion position.

According to another feature according to the present disclosure, the second articulation portion is preferably configured to pass through the first bore. In other words, the guiding device is configured to be inserted through the first flange and then the second flange by translation along the transverse direction in the first direction.

Thus, the second backrest can be assembled on the guiding device by translation following the transverse direction.

According to a complementary feature in accordance with the present disclosure, preferably the first bore has in cross-section perpendicular to the axis of rotation a first circular portion and a first notch, the circular portion of the second bore forming a second circular portion and the notch of the second bore forming a second notch, and the first notch is configured to allow the passage of the first stop element and the second stop element through the first notch by translation along the transverse direction.

Thus, the bulk and mass are thus reduced for a given mechanical strength.

In particular, according to a complementary feature according to the present disclosure, preferably the first circular portion has a first diameter and the second circular portion has a second diameter, the first diameter is substantially equal to the second diameter.

In a complementary or alternative manner, in accordance with the present disclosure, the vehicle seat preferably further has the following features:

- the first stop element is a first stud forming a protrusion relative to the second articulation surface,
- the second stop element is a second stud forming a protrusion relative to the second articulation surface, the first stud is angularly aligned with the second stud around the axis of rotation, and
- the first notch is angularly aligned with the second notch around the axis of rotation.

Thus, the assembly of the guiding device and the second backrest is simplified while keeping the same angular orientation around the axis of rotation of the second backrest relative to the guiding device and by simply translating the second backrest relative to the guiding device along the transverse direction.

According to another feature according to the present disclosure, preferably the first stud has a chamfer configured to position and closely maintain the second flange between the first stud and the second stud by rotating the second backrest relative to the guiding device around the axis of rotation after insertion of the second stud through the second bore.

Thus, the assembly of the seat with the guiding device is facilitated and the holding of the second backrest relative to the guiding device in the transverse direction is improved.

According to another feature according to the present disclosure, preferably the guiding device comprises a main portion and a retaining portion, the main portion comprises the first hinge portion and the main portion is metallic, the retaining portion comprises the second hinge portion and the retaining portion is made of plastic and molded on the main portion.

Thus, the creation of the guiding device is simplified.

In various embodiments of the vehicle seat according to the disclosure, any of the following arrangements may also be employed:

the first backrest is attached to the guiding device, and the guiding device is pivotably mounted around the axis of rotation relative to the first support and the second support;

the guiding device comprises a guide member and a guide shaft, the guide member cooperates with the first support portion, the guide shaft comprises the second support portion, the first hinge portion and the second hinge portion, and the guide shaft is rigidly attached to the guide member by the first backrest structure;

the first hinge portion and the second hinge portion are arranged between the first support portion and the second support portion in the transverse direction.

The present disclosure further relates to a vehicle comprising at least one vehicle seat.

The invention claimed is:

1. A vehicle seat, configured to accommodate at least two users, the vehicle seat comprising:

a first support and a second support intended to be connected to a vehicle chassis, a guiding device comprising:

a first support portion and a second support portion, the first support portion cooperates with the first support and the second support portion cooperates with the second support, a first articulation portion and a second articulation portion, the first articulation portion has a first articulation surface, the second articulation portion has a second articulation surface, a first backrest comprising a first backrest structure, the first backrest structure is pivotably mounted relative to the first support and the second support around an axis of rotation extending in a transverse direction, a second backrest pivotably mounted around the axis of rotation on the guiding device, the second backrest comprises a second backrest structure, the second backrest structure comprises:

a first flange having a first bore, the first bore cooperates with the first articulation surface, and a second flange having a second bore, the second bore cooperates with the second articulation surface, wherein the second articulation portion further has a first stop element and a second stop element, the second articulation surface is arranged between the first stop element and the second stop element along the transverse direction, the first stop element prevents the movement of the second flange relative to the guiding device along the transverse direction in a first direction, the second stop element prevents the movement of the second flange relative to the guiding device along the transverse direction in a second direction, opposite the first direction, and the second bore has in cross-section perpendicular to the axis of rotation a circular portion and a notch, the notch of the second bore is configured to allow the passage of the second stop element through the notch by translation along the transverse direction.

2. The vehicle seat of claim 1, wherein the second articulation portion is configured to pass through the first bore.

3. The vehicle seat of claim 2, wherein the first bore has in cross-section perpendicular to the axis of rotation a first circular portion and a first notch, the circular portion of the second bore forming a second circular portion and the notch of the second bore forming a second notch, and the first notch is configured to allow passage of the first stop element and the second stop element through the first notch by translation along the transverse direction.

4. The vehicle seat of claim 3, wherein the first circular portion has a first diameter and the second circular portion has a second diameter, the first diameter is substantially equal to the second diameter.

5. The vehicle seat of claim 3, wherein the first stop element is a first stud forming a protrusion relative to the second articulation surface, the second stop element is a second stud forming a protrusion relative to the second articulation surface, the first stud is angularly aligned with the second stud around the axis of rotation, and the first notch is angularly aligned with the second notch around the axis of rotation.

6. The vehicle seat of claim 5, wherein the first stud has a chamfer configured to position and closely maintain the second flange between the first stud and the second stud by rotating the second backrest relative to the guiding device around the axis of rotation after insertion of the second stud through the second bore.

7. The vehicle seat of claim 1, wherein the guiding device comprises a main portion, the main portion comprises the first articulation portion and the main portion is metallic and a retaining portion, the retaining portion comprises the second articulation portion and the retaining portion is made of plastic and molded onto the main portion.

8. The vehicle seat of claim 1, wherein the first backrest is attached to the guiding device and the guiding device is pivotably mounted around the axis of rotation relative to the first support and the second support.

9. The vehicle seat of claim 8, wherein the guiding device comprises a guide member cooperating with the first support portion, a guide shaft comprising the second support portion, a first hinge portion and a second hinge portion, and the guide shaft is rigidly attached to the guide member by the first backrest structure.

10. The vehicle seat of claim 1, wherein a first hinge portion and a second hinge portion are arranged between the first support portion and the second support portion in the transverse direction.

11. A vehicle comprising at least one vehicle seat according to claim 1.

* * * * *